Nov. 15, 1966  W. N. McDANIEL ETAL  3,285,823
NUCLEAR REACTOR
Filed Jan. 18, 1965  7 Sheets-Sheet 3
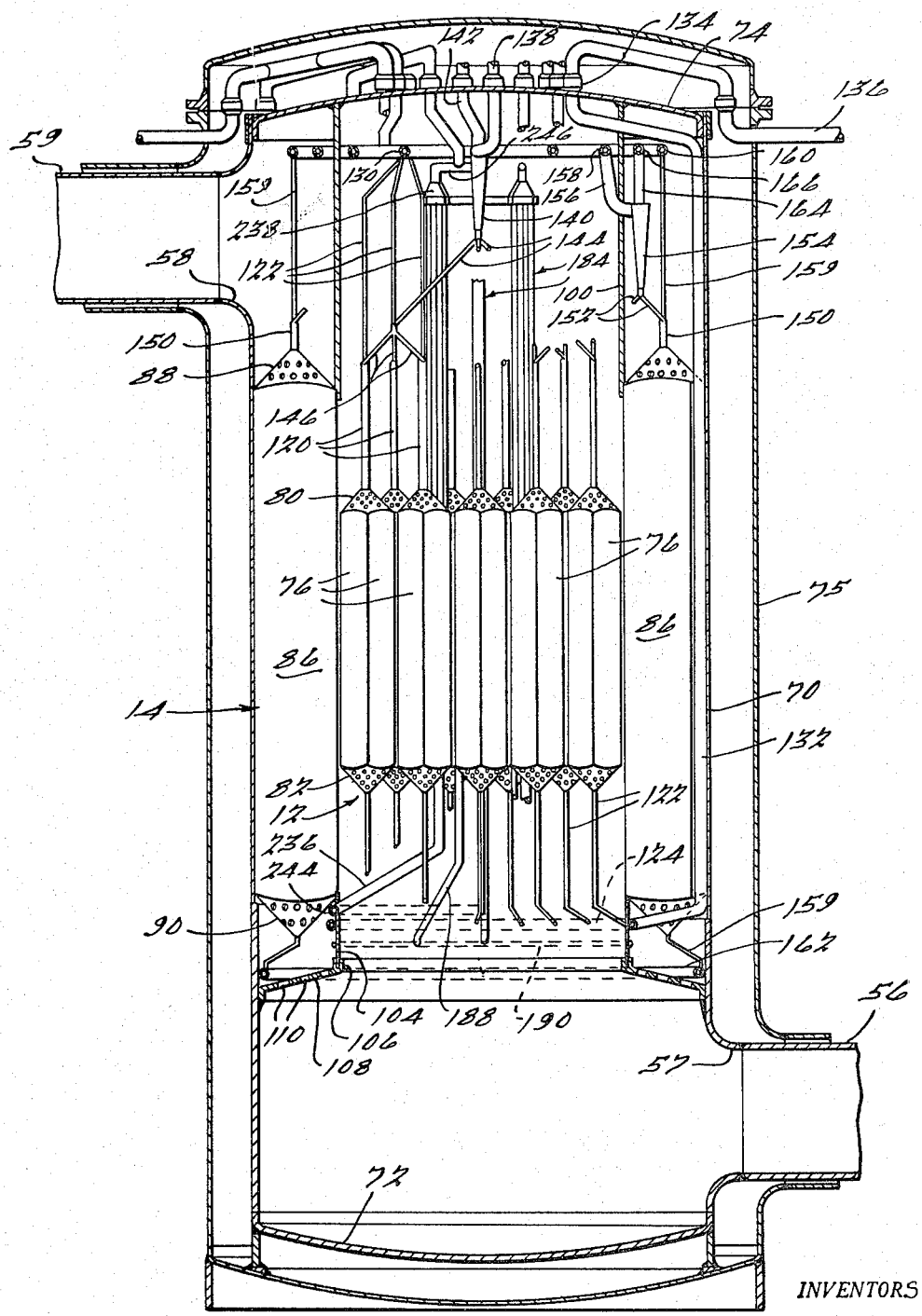
INVENTORS
WEYMOUTH N. McDANIEL
CHARLES E. KLOTZ
BY
Ward, Haselton, McElhannon, Orme, Brooks & Fitzpatrick
ATTORNEYS

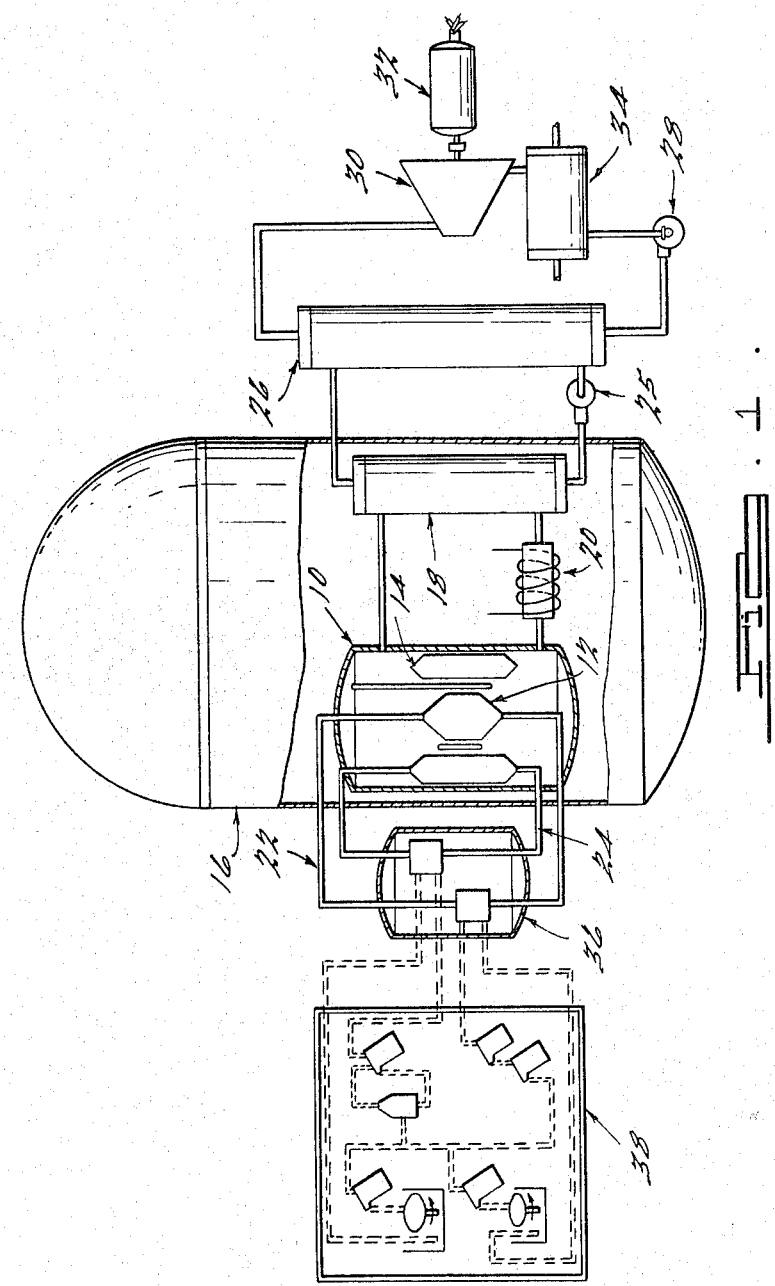

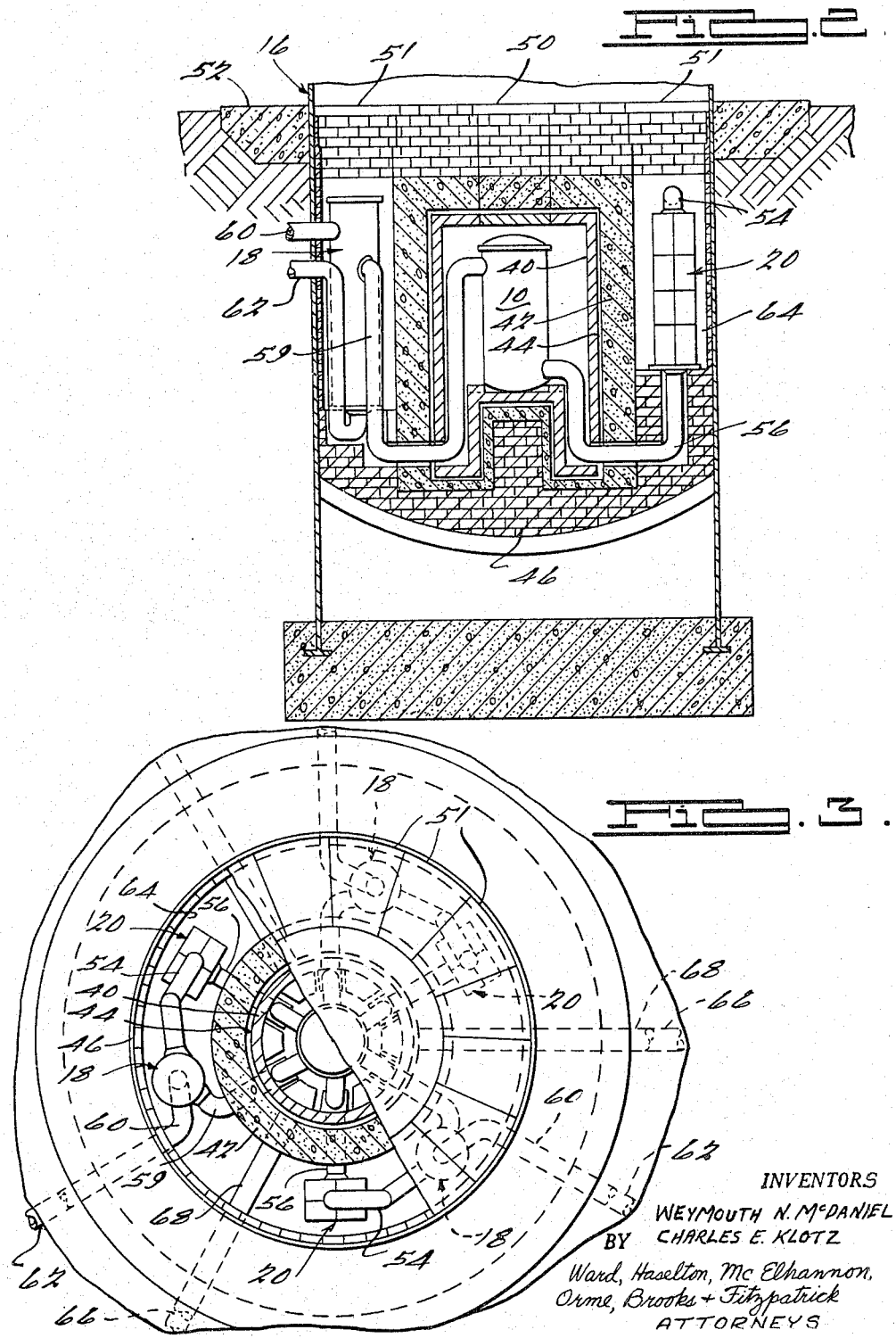

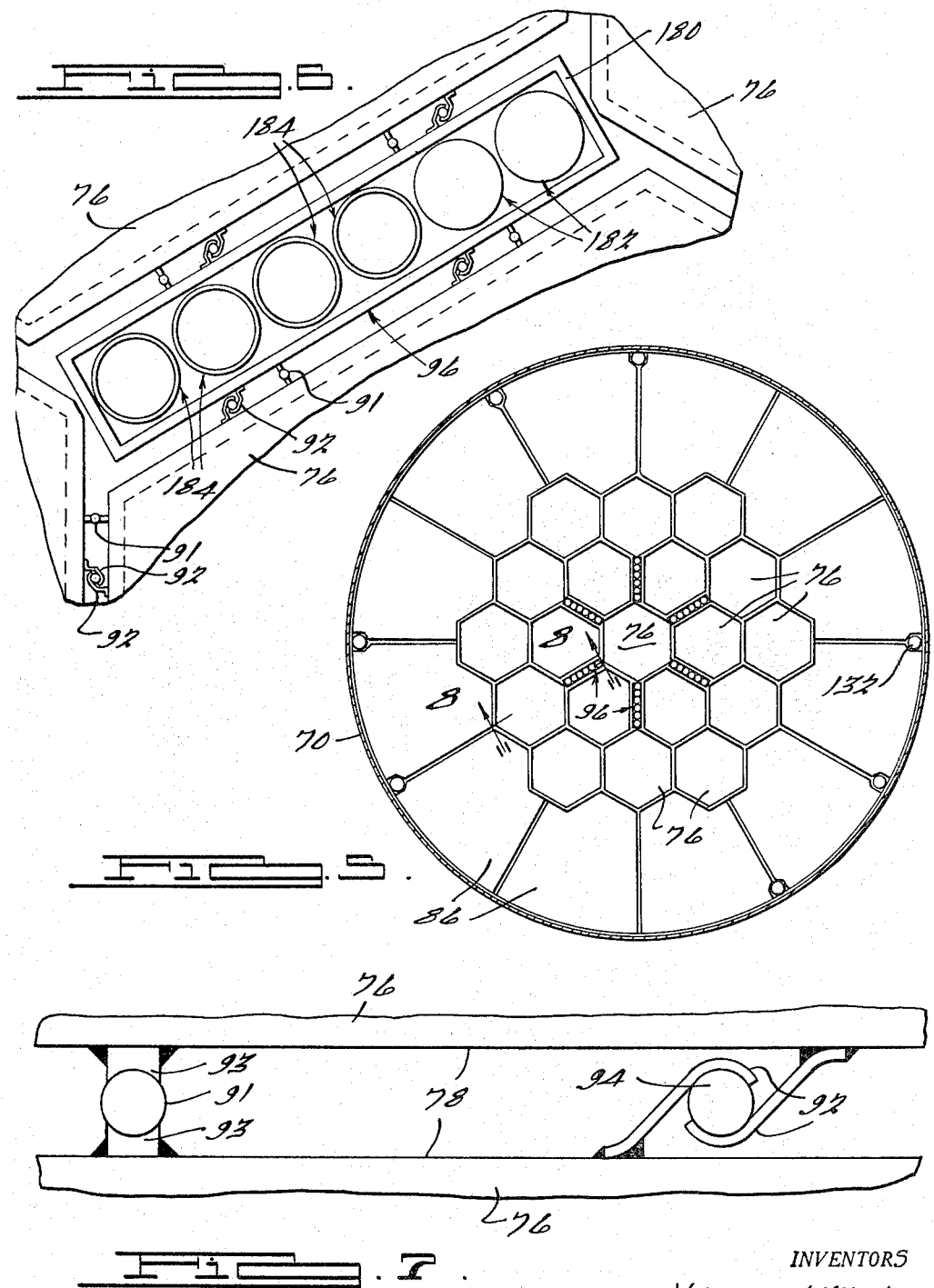

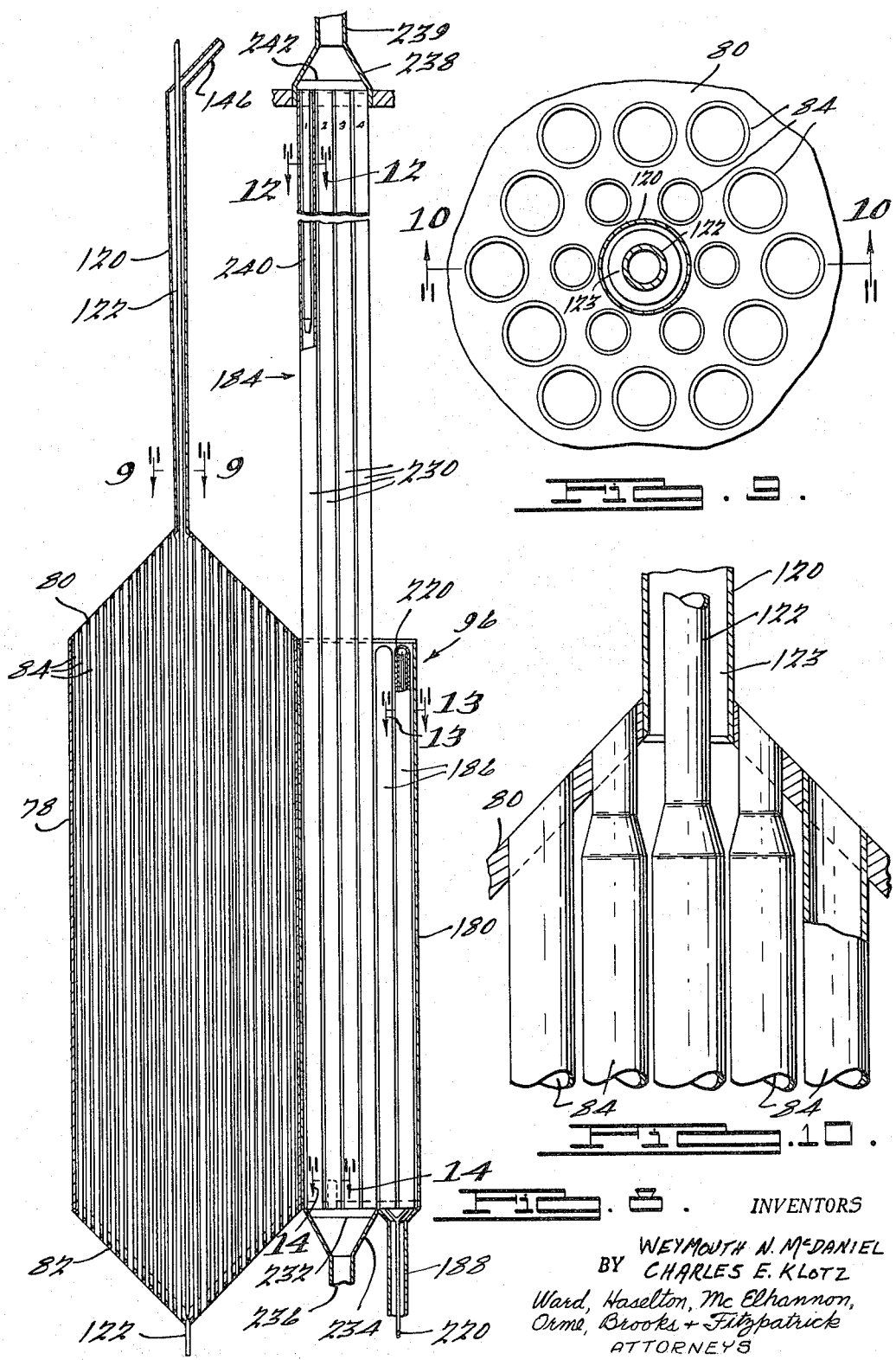

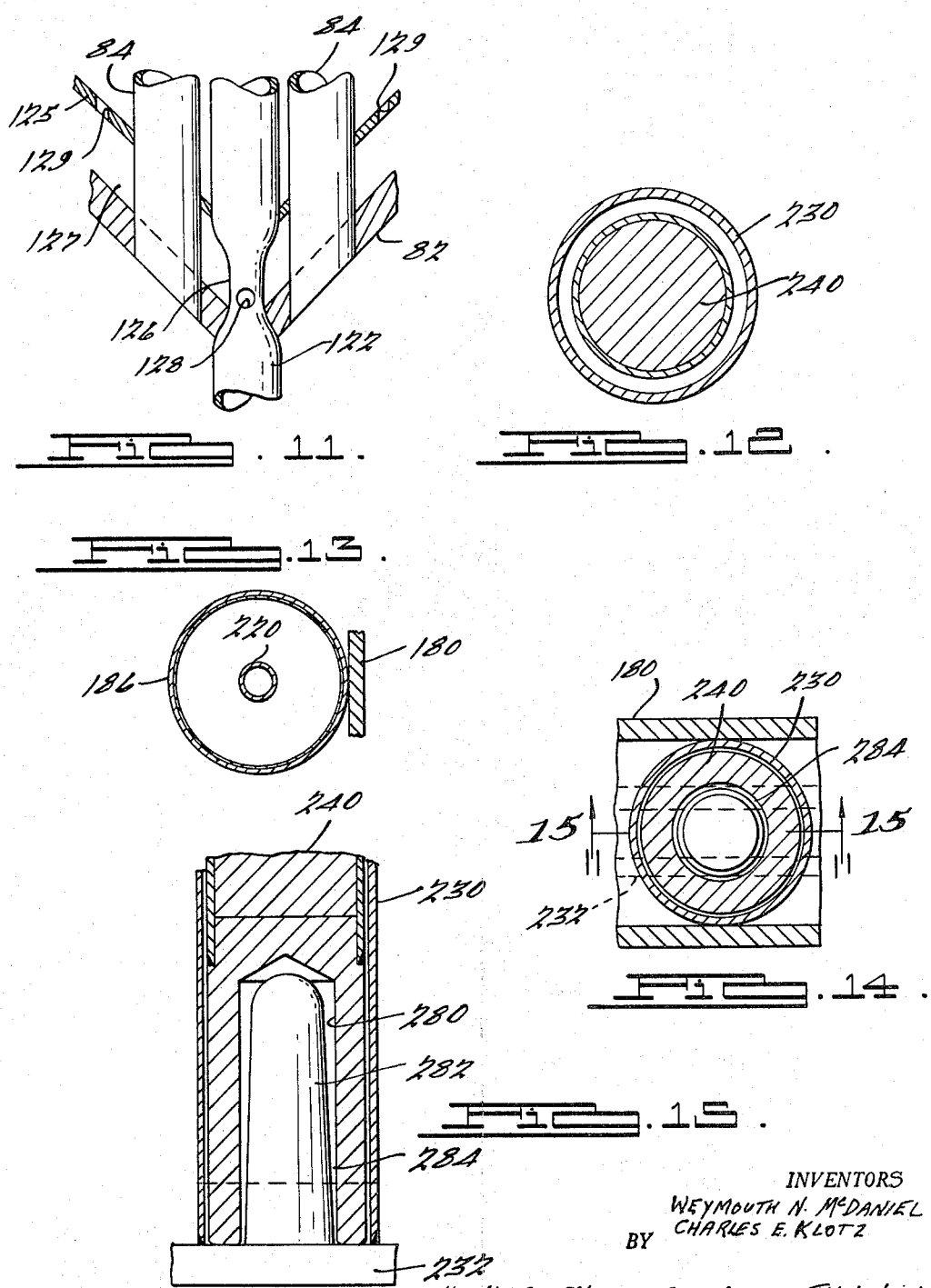

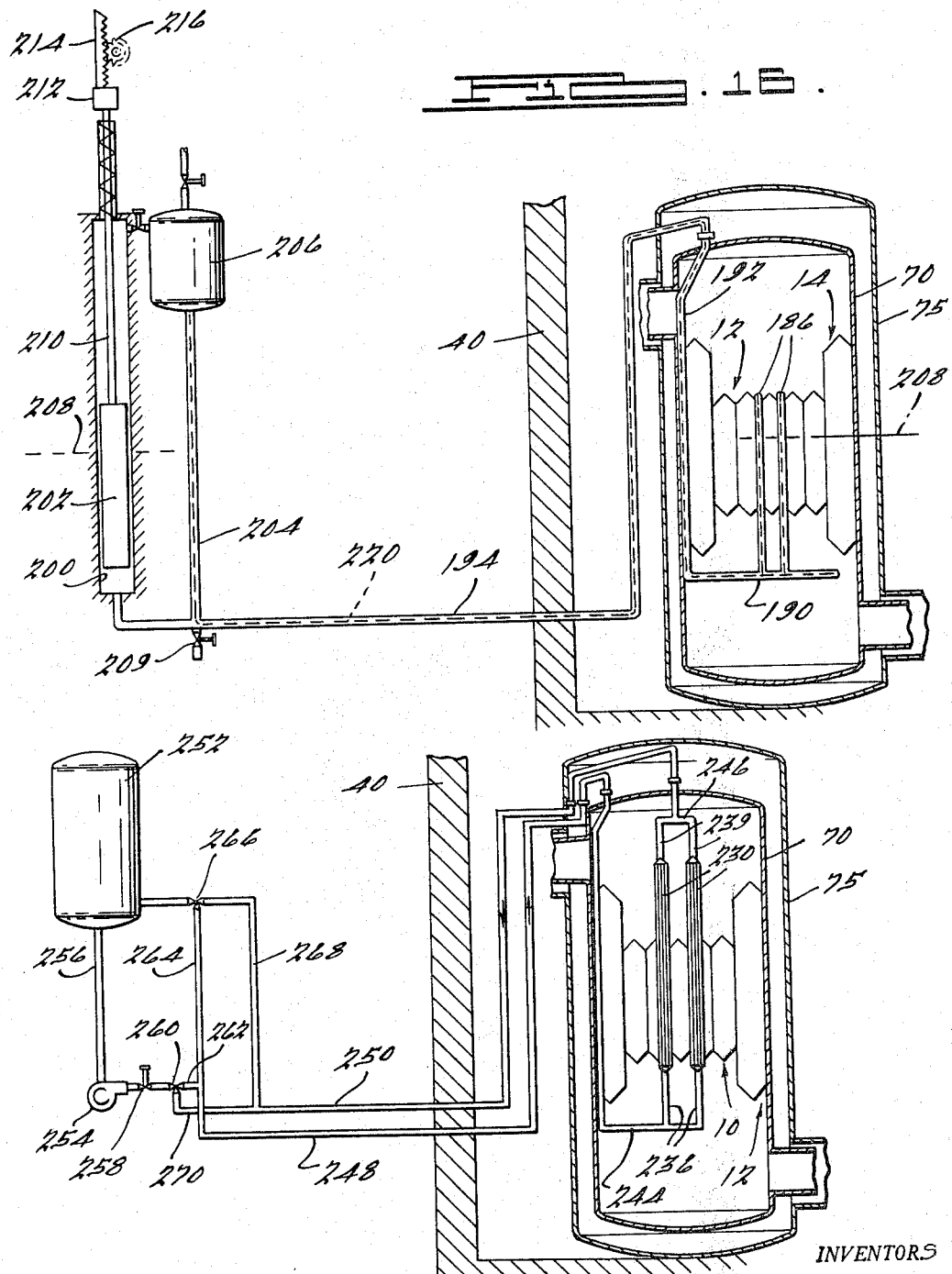

ns
Patented Nov. 15, 1966

3,285,823
NUCLEAR REACTOR
Weymouth N. McDaniel, Baltimore, Md., and Charles E. Klotz, Milwaukee, Wis., assignors to Atomic Power Development Associates, Inc., Detroit, Mich., a corporation of New York
Filed Jan. 18, 1965, Ser. No. 426,178
13 Claims. (Cl. 176—47)

This application is a continuation-in-part of our co-pending application Serial No. 19,008, filed March 31, 1960.

This invention relates to nuclear reactors and has particular reference to a novel fuel system for a nuclear reactor. The invention is useful in any type of reactor, either fast or thermal, and for purposes of illustration is described in connection with a fast neutron breeder type power reactor. In a reactor of this type, the heat generated by the chain reaction is removed by passage of a coolant through the reactor. The heat absorbed by the coolant is then used to generate steam which may be used for any desired purpose, for example, in a conventional power plant including a turbine and generator to produce electrical energy. In the illustrated form of the invention, liquid sodium is used as the coolant and is passed through a heat exchanger in heat exchange relation with a secondary coolant, which may also be liquid sodium or a sodium-potassium alloy. The secondary coolant and water are then passed through a steam generator to produce steam to be utilized in a power plant.

The present invention is directed to a fuel system in which a mobile fuel and/or blanket material is moved at low velocity through the reactor. The fuel is in the form of what may be termed a paste consisting of fuel particles at substantially settled density in a suitable fluid medium such as liquid sodium. In the case of a fast breeder reactor, either the fuel or the blanket material, or both, may be in the form of such a paste.

It has been determined that a paste consisting of fuel particles at settled density in a liquid medium can be made to flow through small passages at velocities appropriate for use of the paste as the fuel or blanket material in a nuclear reactor. In the present reactor both the fuel and blanket material flow as a paste downwardly through the core and blanket sections, respectively, and as low density slurries through separate return lines back to the reactor to form closed circuits. Some or all of the low density slurry may be passed through suitable processing facilities before being returned to the reactor. Since the invention is described in connection with a fast breeder type reactor, for convenience the term "fuel" is sometimes used herein in a generic sense as including either fuel or blanket material, or both.

There are many advantages to be had from the use of a fuel of this type, among which are the fact that the fuel can be continually processed to remove oversized particles, to remove fission gases and fission products therefrom, and to add fissile or fertile material as required. A further advantage is that the particles are continuously mixed or homogenized as they pass through the closed circuit, resulting in substantially uniform temperature and neutron flux exposure and uniform burn-up to greatly increase the useful life of the fuel. Another important advantage is in the greatly reduced size of the reactor for a given power output, greatly simplified fuel fabrication, the reduction or elimination of many maintenance and fuel handling problems, and a lower operating cost. The fuel handling and processing facilities may be located outside of the reactor building, thereby eliminating the cumbersome and expensive fuel handling systems required when solid fuel rods or slugs are employed.

In a fast reactor of the type illustrated, a fuel particle size of about 100 to 200 micron diameter in a carrier such as liquid sodium has been found satisfactory. The particle size may vary somewhat from the size stated above for either fuel or blanket material. During its passage through the reactor the fuel is maintained as a paste of settled density which may be in the order of 60 percent by volume solids and in which the fuel particles are unsuspended in the liquid carrier and rest upon one another. By way of example, the fuel used in the reactor core may consist of a uranium-plutonium alloy in which $Pu^{239}$ is the fissile material and $U^{238}$ is the fertile material. The material employed in the blanket section may comprise a uranium-molybdenum alloy of the same particle size. It will be apparent that other fuels and blanket materials may be employed and may consist of ceramic particles rather than metallic or metallic-alloy particles. Any nuclear material such as uranium, plutonium or thorium may be used, the selection depending upon the type of reactor under consideration. The essential consideration, however, is that the fuel and/or blanket material, whatever form it may take, is maintained as solid particles at settled density in a liquid medium during passage through the active portion of the reactor with the particles resting upon one another and unsuspended in said liquid medium, as distinguished from a slurry or suspension of fuel particles, suspended within a liquid, and also as distinguished from molten or liquid fuel. Calculations involving the specific composition of the fuel, the breeding ratio, the critical mass and other factors are now well understood in the art and are not given herein.

The reactor may employ any conventional operating control system. The operating control system disclosed herein forms the subject matter of a co-pending application in the name of Robert J. Hennig entitled "Nuclear Reactor Control Systems" and assigned to the assignee of this invention, and consists of a liquid poison material and a means to regulate the level of the liquid poison within the core to control the reactivity.

In addition to the operating controls, a reactor of this type must be provided with a safety control system for shutting down the reactor or for immediately stopping the nuclear reaction under emergency conditions. The safety controls disclosed herein also are the subject matter of the above-mentioned co-pending application and consist of rods of poison material such as boron or the like which are hydraulically controlled. The safety rods are disposed within hollow tubes and liquid sodium flows continuously upwardly through the tubes to hold the safety rods above the reactor core during normal operation of the reactor. The sodium flow rate may be decreased to allow the safety rods to gradually drop into the reactor core or, under emergency conditions, the direction of flow of the sodium may be reversed so as to drive the safety rods into the reactor core at high velocity.

A principal object of the invention is to provide a nuclear reactor employing a novel fuel system.

Another object of the invention is to provide a nuclear reactor in which the fuel is circulated through a closed circuit in the form of a settled density paste through the reactor and is withdrawn therefrom as a low density slurry and returned to the reactor as a settled density paste.

A further object of the invention is to provide a reactor of greatly simplified design and of low operating cost so as to be competitive with conventional fuel systems in electric generating plants.

Other and further objects of the invention will be apparent from the following description and claims and may be understood by reference to the accompanying drawings, of which there are seven sheets, which by way of illustration show a preferred embodiment of the invention and what we now consider to be the best mode of applying the principles thereof. Other embodiments of the invention may be used without departing from the scope of the present invention as set forth in the appended claims.

In the drawings:

FIG. 1 is a schematic illustration of a power plant employing a neutronic reactor constructed in accordance with the present invention;

FIG. 2 is a sectional view illustrating the arrangement of the reactor, the electromagnetic pumps and the heat exchangers within the reactor building;

FIG. 3 is a plan view partially in section of the structure shown in FIG. 2;

FIG. 4 is a sectional view through the reactor containment vessel;

FIG. 5 is a view illustrating the geometry of the core and blanket portions of the reactor;

FIG. 6 is a fragmentary plan view illustrating one of the groups of operating and safety controls within the reactor;

FIG. 7 is an enlarged view illustrating the spacing and clamping means between adjacent fuel subassemblies;

FIG. 8 is an enlarged sectional view through one of the fuel subassemblies and one of the control assemblies and is taken on line 8—8 of FIG. 5;

FIG. 9 is an enlarged sectional view taken on line 9—9 of FIG. 8;

FIG. 10 is an enlarged sectional view taken on line 10—10 of FIG. 9;

FIG. 11 is an enlarged sectional view illustrating the fuel outlet at the lower end of one of the fuel sections;

FIG. 12 is an enlarged sectional view taken on line 12—12 of FIG. 8;

FIG. 13 is an enlarged sectional view taken on line 13—13 of FIG. 8;

FIG. 14 is an enlarged sectional view taken on line 14—14 of FIG. 8 with the safety rod in its lowered position;

FIG. 15 is a sectional view taken on line 15—15 of FIG. 14;

FIG. 16 is a schematic illustration of one form of operating control system that may be employed in the reactor; and FIG. 17 is a schematic illustration of one form of safety control system that may be employed in the reactor.

FIG. 1 is a diagrammatic illustration of a power plant utilizing a fast neutron breeder type nuclear reactor as the source of heat. In FIG. 1 the reactor is indicated at 10 and includes a core section 12 and a radial blanket section 14. The reactor is located within the reactor building 16, which also contains the intermediate heat exchangers 18 and the electromagnetic pumps 20 for circulating the coolant through the reactor and the heat exchangers 18. Fuel is circulated in a closed circuit 22 downwardly through the reactor core 12 and in another closed circuit 24 downwardly through the blanket section 14. The coolant, which may consist of liquid sodium, is supplied from the electromagnetic pumps 20 to the lower end of the reactor and flows upwardly through the core and blanket sections 12 and 14 and is discharged from the upper end of the reactor to the upper end of the intermediate heat exchangers 18. The primary coolant flows downwardly through the heat exchangers 18 back to the electromagnetic pumps 20. A secondary coolant, which may also consist of liquid sodium or a sodium-potassium alloy, is circulated by a pump 25 upwardly through the intermediate heat exchangers 18 into the upper end of the steam generator 26 and downwardly through the steam generator back to the pump 25. Water is circulated upwardly through the steam generator 26 in heat exchange relation with the secondary sodium coolant by a pump 28 and is converted to steam within the steam generator and supplied to the turbine 30 which drives a generator 32. The steam after leaving the turbine 30 is supplied to a condenser 34 which returns the water back to the inlet of the pump 28. The system also includes a fuel screening and handling station 36 and fuel reprocessing and refabricating facilities 38.

As shown in FIGS. 2 and 3, the lower portion of the reactor building 16 containing the reactor 10, the heat exchangers 18 and the pumps 20 is preferably disposed below ground level. The reactor 10 is enclosed within a primary shield consisting of a layer 40 of borated graphite spheres confined between perforated steel plates and a surrounding layer 42 of borated graphite blocks confined between solid steel plates. The walls 40 and 42 are separated by an annular gas plenum 44. The shielding further includes firebrick 46 at the lower end of the structure and lining the side walls thereof. Additional firebrick extends from about the ground level downwardly for a substantial distance. A centrally disposed cylindrical plug 50, consisting of portions of the firebrick and the layers 40 and 42, is removable to provide access to the reactor compartment. The shielding above the equipment compartment 64 is made in several sections 51, any of which may be removed for maintenance purposes. A thick concrete apron 52 surrounds the structure at the ground level.

The heat transfer system includes three separate heat exchange loops. As shown in FIG. 3, each of the three electromagnetic pumps 20 has its inlet connected by a pipe 54 to one of the intermediate heat exchangers 18 and its outlet connected by a pipe 56 to one of three separate coolant inlets 57 to the reactor 10. The reactor is provided with three equally spaced coolant outlets 58 each of which is connected by means of a pipe 59 to the inlet of one of the heat exchangers 18. The inlet and outlet connections 57 and 58 of the reactor may be reversed to provide a downward coolant flow if desired. The inlet and outlet pipes 60 and 62 for the secondary coolant are connected to the steam generator as described. Helium or any other suitable inert gas is supplied to the equipment compartment 64 by pipes 66 and flows through the compartment and through the openings in the shielding through which the coolant pipes pass, into the reactor compartment. The helium then flows through the shield layer 40 into the annular plenum 44 and is withdrawn for circulation through a cooler by means of pipes 68. The upper portion of the reactor building may contain an overhead crane and other suitable equipment for installation or removal of any of the various components of the system.

The reactor vessel comprises a cylindrical tank 70 having a lower end wall 72 welded thereto and a crown-shaped head 74 welded to the upper end thereof. The reactor vessel is enclosed within and supported by a secondary containment vessel 75 having openings for the coolant inlet and outlet pipes 56 and 59 and the various other pipes required. Both of the vessels may be made of stainless steel.

The core section 12 of the reactor comprises a series of fuel subassemblies 76 each consisting of a shell and tube structure for circulating the paste fuel and the liquid sodium coolant therethrough in heat exchange relation. The subassemblies 76 are hexagonal in shape, and in the illustrated embodiment of the invention, there are nineteen such subassemblies arranged as shown in FIG. 5. Each subassembly comprises an elongated hexagonal shell 78 having conical tube sheets 80 and 82 at its upper and lower ends, respectively. Each fuel subassembly contains a large number of tubes 84 which are welded or otherwise rigidly secured at their opposite ends to the tube sheets 80 and 82. There may be several hundred such tubes within each subassembly, and the size and spacing of the tubes may be varied as required. The tubes 84 form passages for the upward flow of the primary sodium coolant through the core of the reactor. The fuel flows downwardly in the form of a paste on the shell side of each subassembly.

The blanket section 14 of the reactor includes a number of individual blanket subassemblies 86 of the shell and tube type and having an axial extent considerably greater than the subassemblies forming the core so that the blanket subassemblies extend above and below the upper and lower ends of the core subassemblies for substantial distance. Each blanket subassembly 86 comprises an outer shell having a shape as shown in FIG. 6 so as to conform to the irregular surface defined by the outer surfaces of the adjacent core subassemblies and so that the outer surfaces of the blanket subassemblies together form a generally cylindrical surface. The blanket subassemblies 86 are provided at their upper and lower ends with conical tube sheets 88 and 90 and also contain a number of coolant tubes which are secured at their opposite ends within the openings in the tube sheets 88 and 90. The coolant also flows upwardly through the tubes in the blanket subassemblies 86.

The core subassemblies 76 are secured together in properly spaced relation by a series of spacing rods 91 and clamps 92 to form a rigid unitary structure. Each subassembly is provided with a series of the clamps 92 and spacer pads 93 welded to its outer surface. The spacer rods 91 are inserted between the pads 93 on adjacent subassemblies, and locking rods 94 are inserted between the clamps 92 of adjacent subassemblies. The rods 91 and 94 may be welded to the pads 93 and clamps 92 at their lower ends. The blanket subassemblies 86 are secured together in a similar manner, and the core subassemblies in the outer row are secured to the inner surfaces of the blanket subassemblies 86 in the same way. The control subassemblies 96 are secured between the core subassemblies in the second row in a similar manner, the latter being slightly irregular in shape to accommodate the control subassemblies. The entire core and blanket sections are supported from the head 74 of the reactor vessel 70 by a series of hanger rods 100 which are welded to the underside of the head 74 and to the upper ends of the blanket subassemblies.

The vessel 70 is provided with a coolant flow divider at the lower end of the blanket subassemblies above the coolant inlets 57. The flow divider comprises a vertically extending skirt 104 which is received at its lower end within a groove formed in a collar 106 on a baffle 108 which is secured at its outer edge to the inner wall of the tank. The baffle 108 is provided with a series of openings 110 through which the coolant flows to the blanket subassemblies 86. The coolant flows upwardly through the skirt 104 to the core assemblies 76. The coolant from both the core and blanket is withdrawn from the reactor vessel at the upper end thereof through the outlet pipes 59 after which the coolant is passed through the intermediate heat exchangers 18 and electromagnetic pumps 20 and back to the coolant inlet pipes 56 in the manner described.

The core subassemblies are all of identical construction, although the number and size of the coolant tubes may not be the same for all subassemblies. Each subassembly 76 includes a tapered feed pipe 120 through which the paste fuel is supplied to the upper end of the shell 78. An eductor pipe 122 extends downwardly through the tapered feed pipe 120 to define an annular passage 123 for flow of the paste into the shell 78. An orifice plate 125 extends across the lower end of the shell 78 in spaced relation to the tube sheet 82 to define a plenum 127 into which the paste is discharged through orifices 129 in plate 125. The eductor pipes 122 extend downwardly through the shells 78 and are connected at their lower ends to a ring header 124. Each of the eductor pipes 122 is provided with a venturi portion 126 within plenum 127 and with a series of apertures 128 in the venturi portion 126. The upper ends of the pipes 122 are connected to a ring header 130 from which the pipes 122 are supplied with liquid sodium. As the sodium flows downwardly through the eductor pipe 122 the venturi 126 causes a reduction in pressure, thereby enabling the paste fuel to be drawn into the pipe 122 through the apertures 128. The fuel is in the form of a low density slurry in the pipe 122 below the lower tube sheet 82 and is discharged into the header 124 as a low density slurry. The slurry consists of the fuel particles disposed in a liquid sodium carrier, and may be of the order of 5 percent by volume solids. A pipe 132 is connected at its lower end to the header 124 and extends upwardly along the inner wall of the tank 70 to a coupling 134 on the head 74 of the tank. The blanket subassemblies 86 may be suitably notched at their outer surfaces as shown in FIG. 5 to accommodate the pipe 132 and other piping to be described. After passing out of the tank 70 the slurry is circulated through the fuel handling and reprocessing and refabrication facilities as required by means of the pipe 136. After being suitably processed, the fuel re-enters the tank in the form of a slurry by means of a pipe 138 which leads to a hydroclone 140. The hydroclone may be of any suitable type, the details of which are not shown herein, and is adapted to separate the slurry into relatively pure liquid sodium which is discharged through the outlet pipe 142 from the hydroclone, and into the settled density paste which is discharged through the lower end of the hydroclone into pipes 144. One of the pipes 144 leads to the feed pipe 120 for the central core assembly 76, while each of the other pipes 144 leads to branch pipes 146, each of the latter being connected to one of the feed pipes 120 for supplying the remaining core subassemblies 76 with the paste fuel.

The fuel is circulated through the blanket section of the reactor in a similar manner by means of feed pipes 150 connected to the upper tube sheets 88 of the blanket subassemblies 86. The feed pipes 150 are connected by branch pipes 152 to one of the hydroclones used in the blanket fuel system. There are six hydroclones 154 employed in the blanket fuel system each communicating by means of a pipe 156 with a ring header 158 adapted to supply a low density slurry to the hydroclones 154. There are twelve blanket subassemblies so that each hydroclone 154 supplies two of the blanket subassemblies with the paste fuel through branch pipes 152 and feed pipes 150. Each of the blanket subassemblies is also provided with an eductor pipe 159 connected to a ring header 160 for supplying liquid sodium to the pipes 159. The eductor pipes 159 are similar in construction to the pipes 122 employed in the core section. The lower ends of the eductor pipes 159 are connected to a ring header 162 into which the low density slurry is discharged. The slurry is then passed upwardly through one of the pipes extending along the inner wall of the tank 70 and may pass from the tank through the head 74 for reprocessing or other handling as required. The blanket fuel slurry then re-enters the tank and is supplied to the header 158 from which the slurry is conducted by pipes 156 to the hydroclone 154 for separation into the settled density paste which is discharged into branch pipes 152, and relatively pure liquid sodium which is discharged through pipes 164 into the header 166. From the header 166 the sodium may be withdrawn from the tank for processing as required.

One of the principal advantages of a mobile fuel system for a reactor is that all of the piping that is required may enter and leave the reactor vessel head 74 as illustrated, this greatly simplifying installation and maintenance of the reactor. In assembling the reactor the fuel subassemblies are secured together in the manner described and the required piping attached thereto and to the several headers. The operating and safety controls are also secured to such assembly and the entire assembly then secured to the head 74 and the hanger rods 100. This assembly is then slid downwardly into the tank until the lower end of the skirt 104 seats in the collar 106 of the flow divider baffle 108, the latter being welded to the tank. The head is then sealed and welded in place.

The various pipes required for circulating the fuel and the sodium carrier through the reprocessing facilities may then be attached and the cover for the secondary containment vessel may be welded in place.

The operating control system is illustrated schematically in FIG. 16 and is adapted to maintain the reactivity of the reactor at the required level. It has been customary to employ solid poison rods made of boron or other suitable material and to mechanically move such rods into or out of the core as conditions require. The operating control system illustrated herein is a liquid system rather than a mechanical system, although it will be apparent that other control systems may be used in the present reactor.

As shown in FIGS. 5 and 6, there are six operating and safety control subassemblies 96 each arranged within the core of the reactor between a pair of core subassemblies 76 in the second row. Each control subassembly 96 comprises a rectangular shell 180 disposed between and secured to the opposing sides of two of the core subassemblies 76 by the spacing and clamping members 91–94 employed for maintaining the several core subassemblies in assembled relation. Each of the shells 180 contains a pair of operating controls 182 and four safety controls 184. There are thus six pairs of operating controls symmetrically disposed around the central core subassembly and six sets of four safety controls similarly arranged.

Each control subassembly 96 includes a pair of tubes 186 closed at their upper ends and open at their lower ends to communicate with a pipe 188 leading to a ring header 190. A pipe 192 extends from the header 190 upwardly along the inside wall of the reactor vessel and passes out through the head 74 of the reactor vessel 70 and through the secondary containment tank 75. A pipe 194 leads to the lower end of a cylinder 200 containing a piston 202 loosely fitting within the cylinder 200. A line 204 leads from the pipe 194 to the lower end of a collection and purge tank 206. The entire system thus far described is filled with a liquid poison such as lithium-6, and normally the lithium is maintained within cylinder 200 and the operating control tubes 186 at the level indicated by the line 208 in FIG. 16. The system may be filled and drained by means of valve 209.

The piston 202 is provided with a rod 210 which is connected at its upper end to a gas cylinder actuating device 212 and to a rack 214 meshed with a pinion 216, the latter being driven when required through an electric motor or other source of power. The level of the lithium is adjusted as required by moving the piston downwardly further into the cylinder 200 when the level is to be raised and by withdrawing the piston when the lithium level is to be lowered. The gas cylinder 212 may be employed for relatively short and rapid strokes of the piston 202 to obtain small variations of the volume of lithium within the reactor core, while the pinion 216 and the rack 214 may be employed for obtaining longer and slower strokes of the piston 202. The control tubes may be made of stainless steel provided with a coating of columbium on all interior surfaces.

A small diameter tube 220 is disposed within each of the operating control tubes 186. The tubes 220 are open at their upper ends which terminate adjacent the closed upper ends of the tubes 186. The tubes 220 within each pair of operating control tubes 186 are joined at their lower ends into a single tube which passes through the pipe 188 and connects with a similar small diameter tube located within the header 190 and passing through the pipes 192, 194 and 204 back to the collection and purge tank 206. The tubes 220 may be made of columbium or other material which is resistant to corrosion by lithium, and are indicated by the dotted lines in FIG. 16. The tubes 220 are designed to carry off any helium that may collect in the operating control tubes 186 due to neutron absorption in the lithium, and are also designed to equalize the pressure within the control system.

The safety control system is illustrated schematically in FIG. 17. Each group of safety controls comprises four elongated tubes 230, the lower portions of which extend into one of the shells 180. The tubes 230 are supported at their lower ends on a support plate 232 which extends across the upper end of a header 234 connected to a supply pipe 236. Each group of tubes 230 is provided with an outlet header 238 connected to an outlet pipe 239.

A poison rod 240 is disposed within each of the tubes 230 and may consist of a slug or rod of solid boron carbide in a perforated stainless steel jacket. The rods 240 are of smaller diameter than the inside diameter of their respective tubes 230. A retaining plate 242 extends across each outlet header 238 to limit upward travel of the rods 240. The supply pipes 236 of adjacent groups of safety control tubes are connected to a common supply header 244, while the outlet pipes 239 of such groups have a common outlet header 246. Each two adjacent safety control groups have separate inlet and outlet headers 244 and 246.

Each two groups of safety controls are connected into a closed circuit, one of which is illustrated in FIG. 17. As shown in FIG. 17, each inlet header 244 is connected to an inlet pipe 248 and the related outlet header 246 is provided with a return line 250. The system includes a storage tank 252 and a constant speed pump 254 having its inlet connected to a line 256 leading from the tank 252 and its outlet connected to the supply line 248 through a shutoff valve 258 and three-way valve 260.

During normal operation of the reactor, the valve 258 is open and the valve 260 is set so that liquid sodium will be supplied from the pump 254, past valve 260 to line 262, which opens into a line 264 connected at its lower end to the inlet pipe 248 and at its upper end to a second three-way valve 266, the latter preventing flow through line 264 at such time. The return flow through pipe 250 is through a line 268, past valve 266 to the tank 252 and back to the pump 254.

The sodium is circulated by the pumps 254 at such a rate as to maintain the poison rods 240 at the upper ends of tubes 230 against retaining plates 242 as illustrated in FIG. 8, the rods being held against downward movement by the upward flow of sodium through the tubes 230. The radially innermost rods 240 of each group may have a greater clearance within their tubes 230 than the remaining safety rods and such clearance may be progressively decreased radially outwardly within each group of safety rods. Thus, in the event of a reactor shutdown, the velocity of the sodium flow may be decreased so that the innermost rods will fall into the reactor core and then, as the flow velocity is further decreased, the remaining rods will drop by gravity until the reactor is completely shut down. In the event of an emergency condition, the direction of flow through the sodium loops may be reversed by manipulation of the valves 260 and 266, in which case the poison rods will be immediately driven downwardly into the reactor core to stop operation of the reactor. When the positions of valves 260 and 266 are reversed, line 262 is closed by valve 260 and a line 270 is opened, thereby connecting the return line 250 to the pump outlet. Line 268 is now closed by valve 266 while line 264 is opened, thereby obtaining an immediate reversal of flow in the lines 248 and 250 to drive the safety rods into the reactor core.

As shown in FIG. 15, each of the control rods 240 is provided at its lower end with an upwardly opening recess 280 forming a dashpot chamber. The lower support plates 232 are provided with tapered plugs 282 extending upwardly therefrom in axial alignment with each of the safety rods. This arrangement provides a dashpot or decelerating effect to the safety rods as they reach the lower ends of the tubes 230. The liquid sodium within the dashpot chamber 280 must be forced out past the restricted annular opening 284 between the wall of the chamber and the plug 282 thereby slowing down the control rod and cushioning the same as it reaches its lowermost position.

The safety control rods are thus hydraulically actuated and controlled rather than being actuated by mechanical devices as in prior installations. As in the case of the operating controls this arrangement possesses many advantages, among them elimination of the necessity of mounting mechanical actuating devices in axial alignment with the control rods at the top or bottom of the reactor. Since the piping may enter the reactor vessel at any arbitrary point, the actuating mechanism may be located outside of the reactor building while maintaining the control rods in the most effective position thereof around the center of the reactor core. The three independent flow loops for the liquid sodium which control the position of the safety rods represents an added safety factor in the event of failure of one of the pumps or the valves associated therewith.

In a physical embodiment of an apparatus operative in accordance with the invention, the following dimensions are typical. Referring to FIG. 4, the reactor vessel 70 has an overall height of about 14 feet, a diameter of about 5½ feet and a ⅜ inch wall thickness. The corresponding dimensions for the outer container vessel 75 are, height about 15 feet, diameter about 6½ feet, wall thickness ⅜ inch. Referring to FIGS. 8-11, inc., each of fuel subassemblies 76 has an overall height of about 52 inches, and a widest inside diameter of the hexagonal cross-section of about 16 inches. The inlet and outlet conduits 56 and 59, for flow of the coolant liquid, have diameters of about 18 inches. Each such fuel subassembly 76 is provided with about 570 coolant tubes 84, extending the length thereof in spaced, parallel relation as shown in the drawings, each coolant tube having an outside diameter of about 0.28 inch and an inside diameter of about 0.26 inch. Referring to FIGS. 10 and 11, the eductor pipe 122 has the same internal and external diameter as the coolant tubes in the main portion thereof. Referring to FIG. 10, the annular spacing between the feed pipe 120 and the upper portion of the eductor pipe 122, is about 0.10 inch. Referring to FIG. 11, the eductor pipe 122 has an inside diameter in its most restricted venturi portion as at 126, of about 0.14 inch, and in this portion is provided with three equally spaced apertures 128, each of diameter about 0.1 inch. Referring to the same figure, the feed plate 125 in each fuel subassembly is perforated by holes 129 of diameter about 0.06 inch each. Referring to FIGS. 4 and 5, each blanket subassembly 86 has an overall height of about 75 inches, an outside diameter of about 64 inches and an equivalent circular inside diameter of about 37 inches, as defined by a circle drawn to embrace the entire core assembly. Each blanket assembly is provided with about 200 coolant tubes extending in parallel and equally spaced relation throughout the height thereof, each coolant tube having an outside diameter of about 0.35 inch and an inside diameter of about 0.33 inch. The fuel paste is fed at settled density through the fuel subassemblies 76 at a rate of about ⅔ foot per hour, and for the blanket subassemblies 86 is fed therethrough at the rate of about one foot per hour. The sodium coolant liquid is fed through the coolant tubes 84 of the fuel subassemblies 76 at the rate of about 40 feet per second, and is fed through the coolant tubes of the blanket subassemblies 86 at the rate of about 5 feet per second more or less. The total volume of coolant sodium through the core and blanket assemblies is about 80,000 gallons per minute, about 90% of which is fed through the core assembly and the remaining 10% through the blanket assembly. The reactor as thus dimensioned will deliver from the electric generator 32, FIG. 1, an electric power output of about 300,000,000 watts.

What is claimed is:

1. A mobile fuel, nuclear reactor, comprising: a hollow core member having an upper charging inlet and at least one restricted aperture, lower discharging outlet for said fuel, means for continuously supplying to said inlet, a thin slurry comprising discrete particles of material useful in carrying out a controlled nuclear fission chain reaction and a liquid carrier for said particles, means adjacent said inlet for concentrating said slurry by partial deliquefaction thereof to substantially the thickness of a paste, means for introducing said paste into said core member through said inlet, means including said restricted aperture outlet for causing said paste to move through said core member at the settled density of said particles in said liquid carrier with said particles unsuspended in said liquid and resting upon one another, means adjacent said outlet for re-slurrying the paste effluent from said core member by additions of said liquid carrier thereto, and means for recirculating said slurry to said inlet.

2. A mobile fuel, nuclear reactor, comprising: a hollow core member having an upper charging inlet and at least one restricted aperture, lower discharging outlet for said fuel; means for continuously supplying to said inlet a thin slurry comprising discrete particles of material useful in carrying out a controlled nuclear fission chain reaction and a liquid carrier for said particles, means adjacent said inlet for concentrating said slurry by partial deliquefaction thereof to substantially the thickness of a paste; means for introducing said paste into said core member through said inlet, means including said restricted aperture outlet, for causing said paste to move through said core member at the settled density of said particles in said liquid carrier with said particles unsuspended in said liquid and resting upon one another, thereby to generate thermal energy at a high rate by nuclear fission chain reaction of said particles; means for circulating a coolant fluid in heat exchange relationship to said core member but out of contact with said fuel, for extracting said thermal energy as generated; means adjacent said outlet for re-slurrying with said liquid the paste effluent from said core member; and means for recycling said slurry to said inlet.

3. A mobile fuel, nuclear reactor, comprising: a hollow core member having an upper charging inlet and at least one restricted aperture, lower discharging outlet for said fuel; means for continuously supplying to said inlet a thin slurry comprising discrete particles of material useful in carrying out a controlled nuclear fission chain reaction and a liquid carrier for said particles, means adjacent said inlet for concentrating said slurry by partial deliquefaction thereof to substantially the thickness of a paste, the solids content of which volumetrically exceeds the liquid content thereof; means for introducing said paste into said core member through said inlet, means including said restricted aperture outlet for causing said paste to move through said core member at the settled density of said particles in said liquid carrier with said particles unsuspended in said liquid and resting upon one another, thereby to generate thermal energy at a high rate by nuclear fission chain reaction of said particles; means for circulating a coolant fluid in heat exchange relation to said core member but out of contact with said fuel, for extracting said thermal energy as generated; means for transporting said coolant fluid to a point remote from said reactor; means thereat for extracting thermal energy from said coolant fluid; means adjacent said outlet of said core member for re-slurrying with said liquid carrier, the paste effluent therefrom; and means for recirculating said slurry to said inlet.

4. The method of generating thermal energy at high power density by nuclear fission chain reaction in a hollow core member having an upper charging inlet and a lower discharging outlet for a mobile fuel, which comprises: continuously supplying to said inlet a thin slurry comprising discrete particles of material useful in carrying out a controlled nuclear fission chain reaction and a liquid carrier for said particles, concentrating said slurry by partial deliquefaction to substantially the thickness of a paste; feeding said paste through said core member at the settled density of said particles in said liquid with said particles unsuspended in said liquid and resting upon one another, thereby to generate thermal energy at a high power density by nuclear fission chain reaction of said particles; diluting the paste effluent from said outlet by additions of said liquid carrier into said thin slurry, and recirculating said slurry to said inlet.

5. The method of generating thermal energy at high power density by nuclear fission chain reaction in a hollow core member having an upper charging inlet and a lower discharging outlet for a mobile fuel, which comprises: continuously supplying to said inlet, a thin slurry comprising discrete particles of material useful in carrying out a controlled nuclear fission chain reaction and a liquid carrier for said particles, concentrating said slurry thereat by partial deliquefaction to substantially the thickness of a paste the solids content of which volumetrically exceeds the liquid content thereof; feeding said paste through said core member at the settled density of said particles in said liquid with said particles unsuspended in said liquid and resting upon one another, thereby to generate thermal energy at a high power density by nuclear fission chain reaction of said particles; diluting the paste effluent from said outlet by addition of liquid into said thin slurry; and recirculating said slurry to said inlet.

6. The method of generating thermal energy at high power density by nuclear fission chain reaction in a hollow core member having an upper charging inlet and a lower discharging outlet for a mobile fuel, and for efficiently extracting the thermal energy so generated, which comprises: continuously supplying to said inlet a thin slurry comprising discrete particles of material useful in carrying out a controlled nuclear fission chain reaction and a liquid carrier for said particles, concentrating said slurry by partial deliquifaction to substantially the thickness of a paste; feeding said past through said core member at the settled density of said particles in said liquid with said particles unsuspended in said liquid and resting upon one another, thereby to generate thermal energy at a high power density by nuclear fission chain reaction of said particles; continuously abstracting thermal energy so generated by circulation of a coolant fluid in heat exchange relation to said core member but out of contact with said fuel; diluting the paste effluent from said outlet into said thin slurry by addition of said liquid thereto, and recirculating said slurry to said inlet.

7. The method of generating thermal energy at high power density by nuclear fission chain reaction in a hollow core member having an upper charging inlet and a lower dispensing outlet for a mobile fuel, and for efficiently extracting the thermal energy so generated from said core member, which comprises: continuously supplying to said inlet, a thin slurry comprising discrete particles of material useful in carrying out a controlled nuclear fission chain reaction and a liquid carrier for said particles, concentrating said slurry by partial deliquifaction to substantially the thickness of a paste; feeding said paste through said core member at the settled density of said particles in said liquid with said particles unsuspended in said liquid and resting upon one another, thereby to generate thermal energy at high power density by nuclear fission chain reaction of said particles; continuously extracting thermal energy so generated by circulation of the coolant fluid in heat exchange relation to said core member but out of contact with said fuel; transporting said coolant fluid to a point remote from said reactor and extracting thermal energy therefrom; diluting the paste effluent from said outlet into a thin slurry by addition of said liquid carrier thereto, and recirculating said slurry to said inlet.

8. In a mobile fuel, nuclear reactor in combination: a substantially vertically disposed, tubular nuclear fuel reactor cell provided with end closure members at its opposite ends, a series of substantially parallel coolant tubes traversing said cell from top to base and extending through said end closure members, a pipe extending through said top closure member for supplying a mobile fuel comprising discrete particles of a nuclear fuel in a liquid carrier medium to the interior of said cell, an outlet opening at the base of said cell proportioned to cause said fuel particles to flow downwardly at settled density through said cell with said particles unsuspended in said liquid and resting upon one another, and means for circulating a coolant liquid through said coolant tubes for extracting thermal energy from said cell.

9. In a mobile fuel, nuclear reactor in combination: a vertically disposed tubular housing closed at the top and base, a core section centrally disposed within said housing and comprising a series of substantially parallel and vertically disposed, tubular fuel reaction cells, each cell being provided with closure members at its top and base, a series of substantially parallel coolant tubes traversing each said cell from top to base and extending through the end closure members thereof, a pipe extending through the top closure member of each cell for supplying a mobile fuel comprising discrete particles of a nuclear fuel in a liquid carrier medium to the interior of said cell, means including a restricted outlet opening at the base of each said cell proportioned to cause said fuel particles the flow downwardly at settled density through said cell with said particles unsuspended in said liquid and resting upon one another, a pipe communicating with said outlet opening for withdrawing said mobile fuel therefrom, and means for circulating a coolant liquid upwardly through the coolant tubes of each said cell for extracting thermal energy therefrom, said means including a conduit penetrating said housing at the base thereof for introducing said coolant liquid, and an outlet conduit penetrating said housing adjacent the top thereof for withdrawing said coolant liquid.

10. In a mobile fuel, nuclear reactor in combination: a vertically disposed tubular housing closed at its top and base, a core section centrally disposed within said housing and comprising a series of substantially parallel and vertically disposed, tubular fuel reaction cells, each cell being provided with closure members at its top and base, a series of substantially parallel coolant tubes traversing each said cell from top to base and extending through the end closure members thereof, a pipe extending through the top closure member of each cell for supplying a mobile fuel comprising discrete particles of a nuclear fuel in a liquid carrier medium to the interior of said cell, means including a restricted outlet opening at the base of each said cell proportioned to cause said fuel particles to flow downwardly at settled density through said cell with said particles unsuspended in said liquid and resting upon one another, means including a pipe communicating with each said restricted outlet for withdrawing said mobile fuel, a blanket section surrounding said core section and comprising a series of vertically disposed tubular members, each provided with end closure members at the top and base, a series of coolant tubes extending from the top to base of each blanket member and through the end closure members thereof, a pipe penetrating the top closure member of each blanket member for supplying a mobile fuel thereto comprising discrete particles of a nuclear fuel in a liquid carrier, and a restricted outlet through the base closure member of each blanket member proportioned to cause said fuel particles to flow downwardly at settled density through said blanket member with said particles unsuspended in said liquid and resting upon one another, means including a pipe communicating with each said restricted outlet for withdrawing said mobile fuel, means for circulating a coolant liquid upwardly through the coolant tubes of each said feul cell and blanket members for extracting thermal energy therefrom, said means including a conduit penetrating said housing at the base thereof for introducing said coolant liquid and an outlet conduit penetrating said housing adjacent the top thereof for withdrawing said coolant liquid.

11. In a nuclear reactor, a fuel element comprising a hollow shell closed at its opposite ends, a series of coolant tubes extending through said opposite ends of said shell, the space within said shell defining passage means for the flow of fuel downwardly through said shell, a paste fuel in said shell comprising particles of a material useful in carrying out a controlled nuclear fission chain reaction and a liquid carrier for said particles, an educator pipe extending through said shell and having a venturi portion at the lower end of said shell, an opening in said venturi portion of said pipe and said shell having a restricted outlet at its base communicating with said venturi pipe opening, for maintaining said fuel particles at settled density in said carrier liquid within said shell, means for circulating the carrier liquid downwardly through said pipe to effect the flow of said paste fuel through said shell and into said pipe to form a dilute slurry of said particles in said carrier within said pipe, means for circulating said slurry back to the top of said shell, means for separating said slurry into the carrier liquid and said settled density paste fuel, and a pipe for supplying said paste fuel from said separating means to said shell recirculation of said paste fuel through said shell.

12. A fuel system for a nuclear reactor comprising a hollow shell, a series of coolant tubes extending through said shell, a paste fuel in said shell comprising particles of a material useful in carrying out a controlled nuclear fission chain reaction and a liquid carrier for said particles, an orifice plate extending across the lower end of said shell, a plurality of orifices in said plate forming restricted communication between said shell and the space below said plate to maintain said particles at settled density in said carrier liquid within said shell, an educator pipe extending through the space between said plate and the lower end of said shell and having a venturi portion within said space, an opening in said venturi portion of said pipe, means for circulating the carrier liquid through said pipe to effect flow of the paste fuel into the pipe through said opening to form a dilute slurry of said particles in said carrier liquid, means for separating said slurry into the carrier liquid and said settled density paste, and means for conveying said settled density paste to the upper end of said shell for recirculation of said paste through said shell.

13. A nuclear reactor comprising a plurality of fuel elements, said fuel elements defining a series of fuel passages and a series of coolant passages separate from said fuel passages, means for circulating a coolant through said coolant passages, said fuel passages containing a fuel consisting of particles of a material useful in carrying out a controlled nuclear fission chain reaction and a liquid medium for said particles, said fuel passages having restricted outlets so as to maintain the fuel therein in the form of a paste consisting of said particles at substantially settled density in said liquid medium, said fuel elements each having an eductor pipe extending therethrough, said educator pipes having openings communicating with said fuel passages, means for circulating a carrier liquid through said pipes to effect the flow of said paste into said pipes through said openings thereby to effect the flow of said paste through said fuel passages and to form a dilute slurry of said particles in said carrier liquid, means for collecting said slurry from said eductor pipes, means for separating said slurry into the carrier liquid and said settled density paste, means for distributing said paste from said separating means to said fuel passages for recirculation of said paste through said fuel passages, and means for distributing said carrier liquid from said separating means to said educator pipes.

References Cited by the Examiner

UNITED STATES PATENTS

| 2,910,417 | 10/1959 | Teitel | 176—45 |
| 3,092,562 | 6/1963 | Van der Schee | 176—47 |
| 3,159,548 | 12/1964 | Went | 176—46 X |

FOREIGN PATENTS

| 167,674 | 5/1956 | Australia. |
| 207,059 | 3/1957 | Australia. |
| 773,343 | 4/1957 | Great Britain. |

OTHER REFERENCES

Nuclear Science and Engineering, Vol. 2, pp. 501, 512 (1957), an article by Abraham et al.

Nucleonics, September 1954, pp. 16–19. (An article by Went et al.)

The Metal Plutonium, edited by Coffinberry et al., 1961, pp. 410–415.

REUBEN EPSTEIN, *Primary Examiner.*